United States Patent
Katchka

[15] 3,685,730
[45] Aug. 22, 1972

[54] THERMOSTATIC FLOW CONTROL DEVICE
[72] Inventor: Jay R. Katchka, Long Beach, Calif.
[73] Assignee: Robertshaw Controls Company, Richmond, Va.
[22] Filed: Sept. 28, 1970
[21] Appl. No.: 76,120

[52] U.S. Cl. ............... 236/21, 137/66, 137/614.14
[51] Int. Cl. ........................................... F22b 37/42
[58] Field of Search ................. 236/1 H, 21, 15 A

[56] References Cited

UNITED STATES PATENTS 2,387,164  10/1945  McCarty ................ 236/1 H
2,874,904  2/1959  Schwalbach ............ 236/1 H

FOREIGN PATENTS OR APPLICATIONS 1,195,247  6/1965  Germany ............... 236/1 H Primary Examiner—Edward J. Michael
Attorney—Anthony A. O'Brien

[57] ABSTRACT

A thermostatic flow control device including a safety valve and a thermostatic valve controlling flow between an inlet and main and pilot outlets in a casing, operator levers providing permissive control of the safety valve and the thermostatic valve, and a selector stem controlling movement of the levers to provide off, pilot and on conditions for the control device.

18 Claims, 7 Drawing Figures

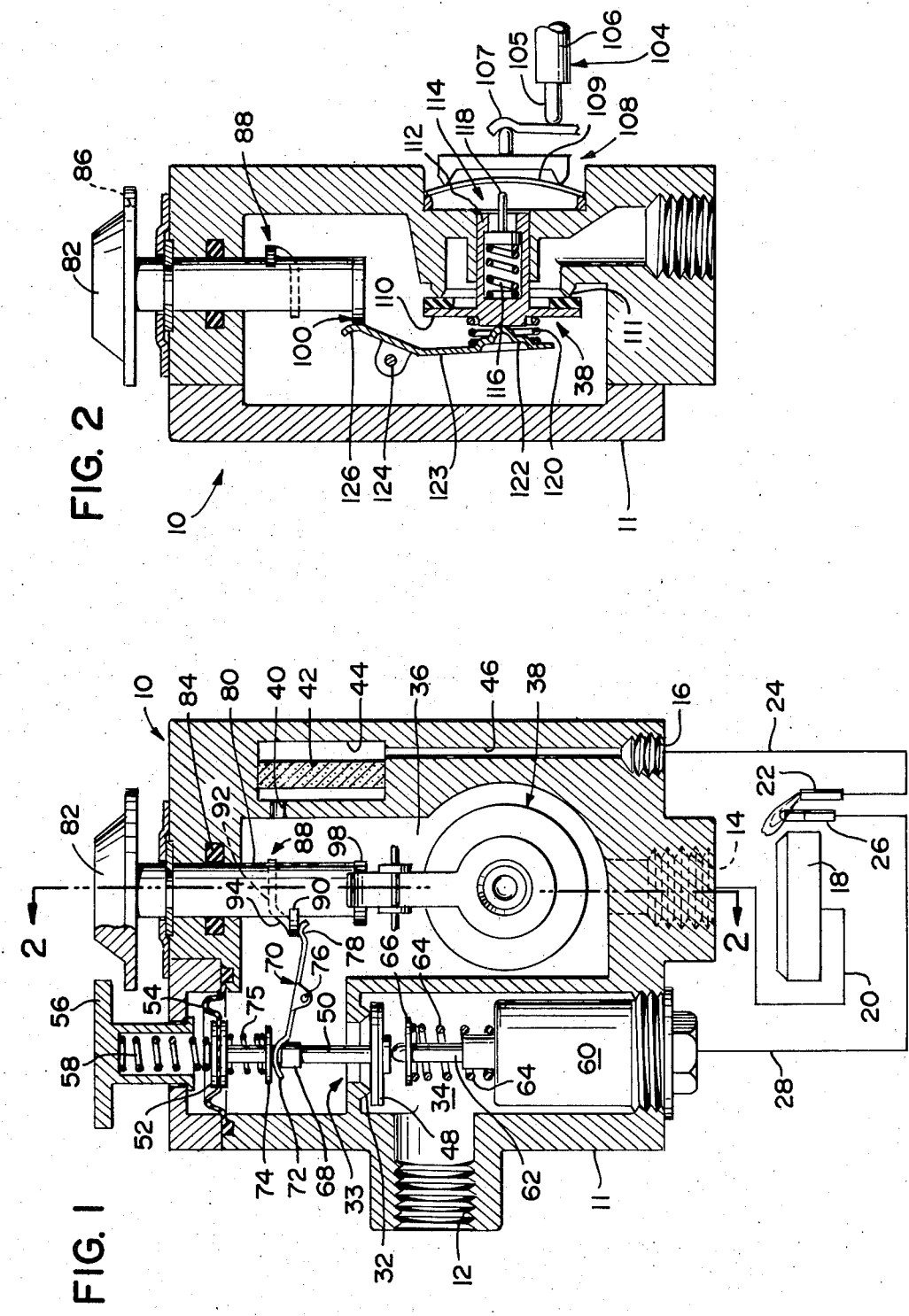

INVENTOR,
Jay R. Katchka
BY Anthony A. O'Brien
ATTORNEY

INVENTOR,
Jay R. Katchka

BY
Anthony A. O'Brien
ATTORNEY

THERMOSTATIC FLOW CONTROL DEVICE

BACKGROUND OF THE INVENTION

Field of the Invention

The present invention pertains to thermostatic flow control devices and, more particularly, to such devices providing complete on-off utilizing only a safety valve and a thermostatically operated valve.

Discussion of the Prior Art

Conventional thermostatic flow control devices, such as those utilized with water heaters and various other heating and cooling appliances to control the flow of fuel to a burner, utilize a manual on-off valve to select conditions for the control device as well as a safety valve and a thermostatically operated valve. The safety valve is utilized to prevent fuel flow through the control device if there is no flame at a pilot burner, and the thermostatically operated valve is normally positioned downstream from the manual valve to supply fuel to the burner under temperature demand. In water heater control devices, for instance, a rod and tube thermostat is utilized to operate the thermostatically operated valve with the thermostat extending into the tank of the water heater to sense water temperatures. The thermostatically operated valves in control devices for heating and cooling appliances, such as furnaces and air conditioning units, are normally operable in response to space thermostats which control the supply of electricity to an operator for the valve, such as a heat motor.

Conventional manual on-off valves take the form of gas cocks or plugs cooperating with conical valve seats or valve discs. In any case, the manual valves must be precisely formed and often require machining which greatly increases production costs. The controls industry has long sought a practical means of eliminating the manual on-off valve; however, attempts to provide a substitute therefor have not been successful in that no inexpensive manner has been found to eliminate the valve while maintaining means to select conditions for the control device.

The embodiment of FIG. 2 of U.S. Pat. No. 3,343,557 to Dunn is exemplary of prior art control devices not utilizing a manual on-off valve; however, complete on-off control is sacrificed for the production cost reduction. In order to regain the sacrificed control, a plug valve is incorporated in the embodiment of FIG. 6; however, this is merely exemplary of conventional expensive control devices.

SUMMARY OF THE INVENTION

Accordingly, it is an object of the present invention to construct a thermostatic flow control device providing complete on-off control without utilizing a manual on-off valve.

The present invention is generally summarized in a flow control device including a thermostatically operated valve and a safety valve controlling fuel flow between an inlet and an outlet in a casing, operators providing permissive control of the thermostatically operated and safety valves, and a selector rotatably positionable in the casing and carrying control means engaging the operators whereby the thermostatically operated and safety valves are controlled simultaneously.

Another object of the present invention is to utilize cam and lever arrangements to simultaneously provide dominating control of safety and thermostatic valves in a flow control device in response to positioning of a selector.

A further object of the present invention is to reduce the number of valve components required in a thermostatic flow control device.

The present invention has another object in that a rotatable selector is utilized to simultaneously control thermostatic and safety valves in a flow control device.

Some of the advantages of the present invention over the prior art are that production and assembly costs are materially reduced and that manual valve functions are supplied by simple cam and lever arrangements without decreasing reliability.

Further objects and advantages of the present invention will become apparent from the following description of a preferred embodiment taken in conjunction with the accompanying drawings.

BRIEF DESCRIPTION OF THE DRAWINGS

FIG. 1 is a front elevation, partially in section, of a flow control device according to the present invention in an off condition.

FIG. 2 is a section taken substantially along line 2—2 of FIG. 1.

DESCRIPTION OF THE PREFERRED EMBODIMENTS

Figure 4:
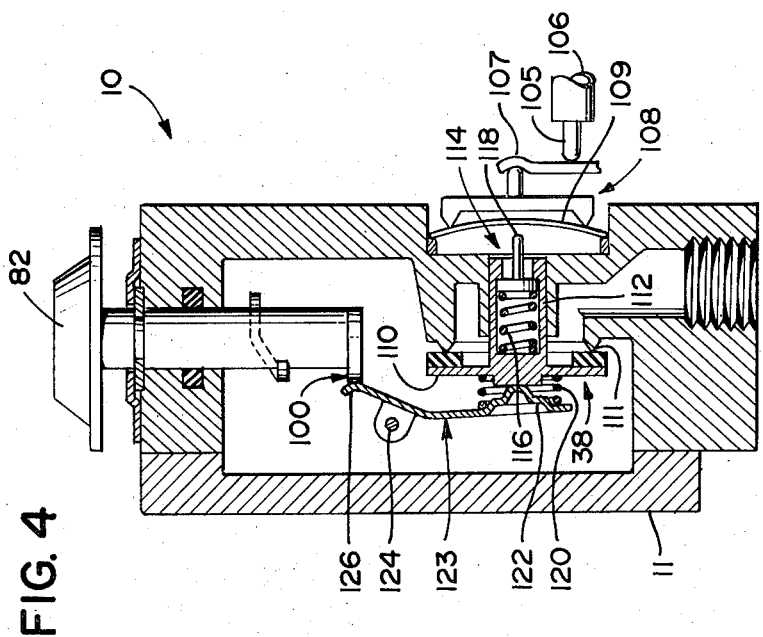
FIG. 4 is a section taken substantially along line 4—4 of FIG. 3.
Figure 3:
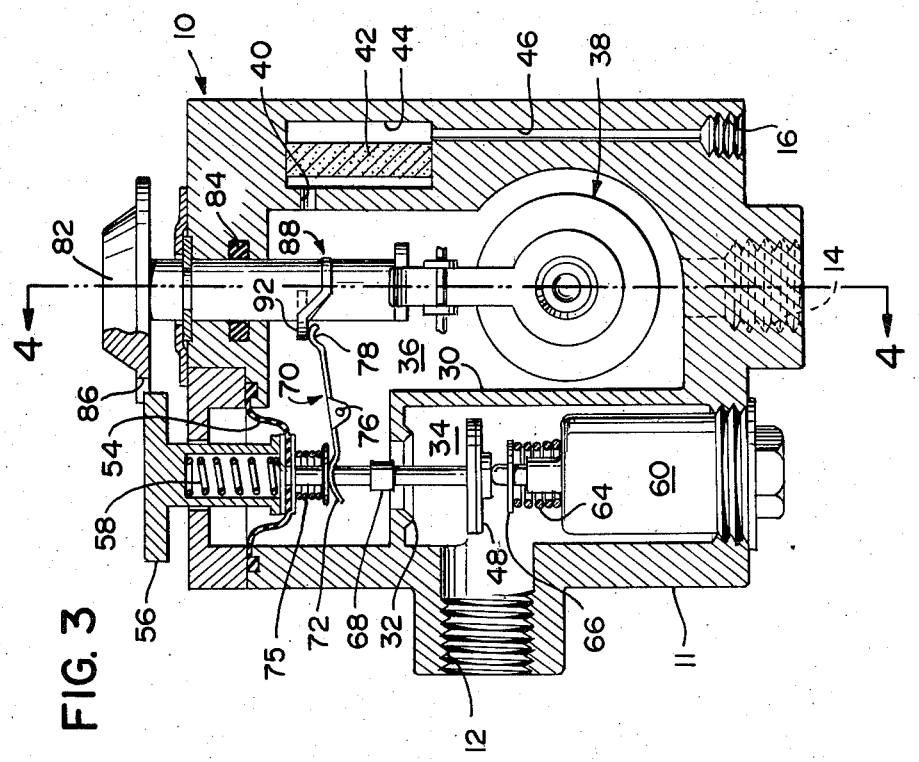
FIG. 3 is a front elevation, partially in section, of the flow control device of FIG. 1 in a pilot condition.
Figure 5:
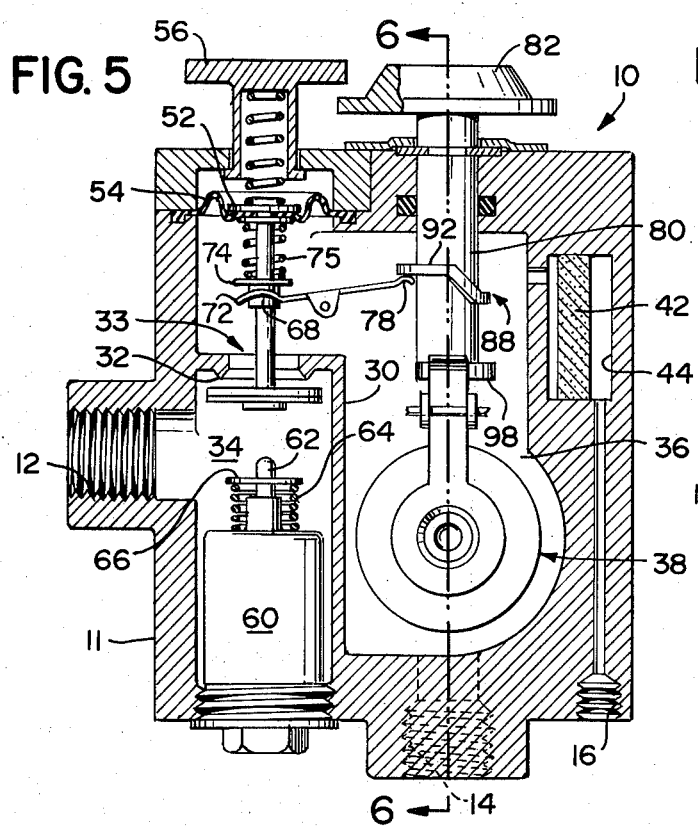
FIG. 5 is a front elevation, partially in section, of the flow control device of FIG. 1 in an on condition.
Figure 6:
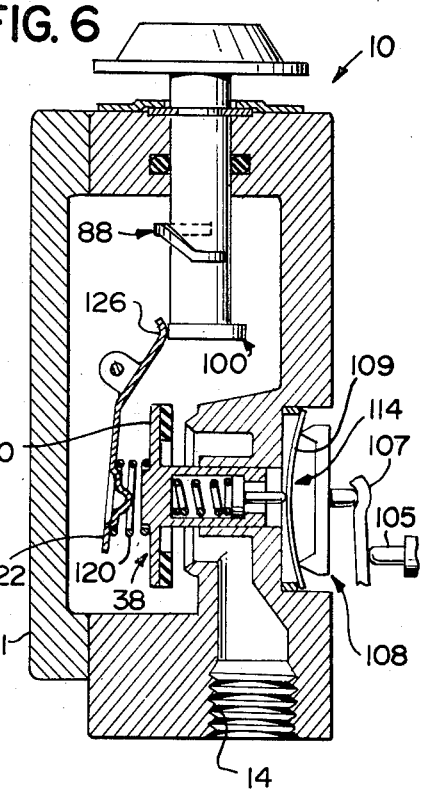
FIG. 6 is a section taken substantially along line 6—6 of FIG. 5.

A thermostatic flow control device 10 according to the present invention is illustrated in FIGS. 1 and 2 in an off condition, in FIG. 3 in pilot condition during reset and in FIG. 4 in a pilot condition, and in FIGS. 5 and 6 in an on condition. The control device 10 includes a casing 11 having an inlet 12 adapted to be connected to a source of fuel, such as a gas supply (not shown), a main outlet 14 and a pilot outlet 16. Main outlet 14 communicates with a main burner 18 through a conduit 20, and pilot outlet 16 communicates with a pilot burner 22 through a conduit 24. A flame sensor in the form of a thermocouple 26 is disposed in flame sensing proximity to pilot burner 22 and is electrically connected to an electromagnetic safety device by means of a cable 28.

A wall 30 in casing 11 terminates in an annular valve seat 32 of a safety valve 33 and defines a chamber 34 communicating with inlet 12 and a chamber 36 communicating with main outlet 14 through a thermostatically operated valve 38 and communicating with pilot outlet 16 through a pilot passage 40, a filter 42 in a cavity 44 and a pilot passage 46.

Safety valve 33 includes a valve member 48 carried on the end of a valve stem 50 and adapted to cooperate with valve seat 32 to control fuel flow between chamber 34 and chamber 36. The other end of valve stem 50 is secured to a pan 52 carried by a sealing diaphragm 54 which is secured at its periphery to casing 11. A hollow reset button 56 is loosely, slidably mounted in the top of casing 11 in axial alignment with valve stem 50, and a coiled bias spring 58 is mounted in compression between the underside of reset button 56 and diaphragm pan 52. A safety electromagnet 60 is supported in casing 11 and controls an armature 62 axially aligned with valve stem 50, and a coiled bias spring 64 is mounted in compression between a plate 66 secured to armature 62 and a casing for electromagnet 60.

A collar or ring 68 is fixed to an intermediate portion of the valve stem 50; the bifurcated end 72 of a pivoted operator lever 70 defines a slot having a width greater than the diameter of ring 68 so that the bifurcated end 72 may abut the washer or disc 74 disposed for movement on the valve stem 50 above ring 68. An override spring 75 is mounted in compression between diaphragm pan 52 and disc 74. Lever 70 is pivotally mounted on a pin 76 which is supported in casing 11, and a cam follower end 78 of lever 70 is disposed adjacent a cylindrical selector stem 80 which extends through casing 11 to a selector dial 82. An O-ring 84 provides a seal between casing 11 and stem 80. The peripheral edge of dial 82 extends under reset button 56 to prevent depression of the button other than when dial 82 is in a pilot position at which time a recess 86 in the peripheral edge of the dial is aligned with reset button 56 to permit depression thereof, as illustrated in FIG. 3. Stem 80 has a control ridge 88 extending partially therearound to form a cam surface having a lower arm 90, an upper arm 92 and a portion 94 interconnecting arms 90 and 92. A control member 98 is secured to the bottom of stem 80 and forms a cam surface having a protrusion 100.

Thermostatic valve 38 is operated by a conventional rod and tube thermostat 104 in which a rod 105 of a relatively low coefficient of thermal linear expansion material is concentrically disposed in a tube 106 of a relatively high coefficient of thermal linear expansion material with the ends of the rod and tube joined as by welding. Rod and tube thermostat 104 is suitably mounted to extend into a medium and to have the free end of rod 105 engage a lever 107 which operates a clicker mechanism 108 by means of a round plate having an annular fulcrum engaging a clicker disc 109. Clicker disc 109 is adapted to snap over-center in response to linear movement of rod 105 such that thermostatic valve 38 is operated with snap action in response to thermostat 104. A valve member 110 cooperates with an annular valve seat 111 and has a hollow stem 112 extending through a bore in casing 11 to clicker mechanism 108, and a valve override mechanism 114 is disposed in the hollow portion of stem 112 and includes a coiled spring 116 mounted in compression between the bottom of the hollow portion and the base of a piston-like member 118. A rod of member 118 extends from stem 112 and is adapted to engage clicker disc 109. A coiled spring 120 is mounted in compression between an operating end 122 of an operator lever 123 and valve member 110, and lever 123 is pivotally supported on a pin 124 in casing 11 and has a cam follower end 126 engaging control member 98 on selector stem 80.

The operation of the present invention will now be described with reference to FIGS. 1 through 6. Assuming the control device to be initially in the off condition illustrated in FIGS. 1 and 2, dial 82 will be rotated such that "off" indicia thereon is aligned with an indexing mark on the top of casing 11. With the selector in the off position, the peripheral edge of dial 82 extends below the peripheral edge of reset button 56 to prevent depressing thereof, and stem 80 is rotated such that cam follower end 78 of lever 70 is riding on lower arm 90 of control ridge 88 to pivot lever 70 clockwise. With lever 70 so positioned, valve stem 50 will be permitted to move valve member 48 into engagement with valve seat 32 due to the force from spring 75 to close safety valve 33. Spring 64 will also bias the safety valve 33 closed. However, if the control device has been in operation and the electromagnet is still locked up, the spring 64 will not bias the valve member 48 to a closed position until sufficient time has elapsed to allow the thermocouple 26 to cool and allow the magnet to "drop-out." With the selector in the off position, cam surface 100 at the bottom of stem 80 is also rotated such that the cam follower end 126 of lever 123 is moved away from stem 80 to pivot lever 123 counterclockwise and cause operating end 122 to force valve member 110 into engagement with valve seat 111 to close thermostatic valve 38. Thus, it may be seen that fuel flow through control device 10 is prevented by closure of safety valve 33 and thermostatic valve 38 when the control device is in the off condition. It will be appreciated that cam surface protrusion 100 of control member 98 and lower arm 90 of control ridge 88 are spaced 90° from each other such that when selector 80 is in the off position lower arm 90 moves lever 70 to close safety valve 33 and protrusion 100 moves lever 123 to close thermostatic valve 38.

To supply fuel to burner 18, selector dial 82 is rotated to align "pilot" indicia thereon with the indexing mark on casing 11 to place stem 80 in the pilot position illustrated in FIGS. 3 and 4. With the selector rotated to the pilot position, cam follower end 78 of lever 70 moves counterclockwise under the force from spring 75 to engage upper arm 92 of control ridge 88 and cam follower end 126 of lever 123 continues to engage protrusion 100 of control member 98 and maintain thermostatic valve 38 closed. Recess 86 in the peripheral edge of dial 82 is aligned with reset button 56 at this time, and reset button 56 may thus be manually depressed without interference from dial 82. It will be appreciated that cam surface protrusion 100 is sufficiently large to have a portion spaced 90° from the end of upper arm 92 adjacent portion 94 to maintain thermostatic valve 38 closed while safety valve 33 is permitted to open with the selector in the pilot position.

Reset button 56 is depressed to engage diaphragm pan 52 against the force from spring 58 and valve stem 50 is moved against the force from springs 64 and 75 to move valve member 48 away from valve seat 32 and permit fuel to flow through inlet 12 and chamber 34 to chamber 36. Thermostatic valve 38 is maintained closed to prevent fuel flow to main burner 18; however, fuel is supplied to pilot burner 22 from chamber 36 through pilot passage 40, filter 42, cavity 44, pilot passage 46 and conduit 24. Pilot burner 22 may be lit by any suitable means such as a match; and, once a flame is established at pilot burner 22, the flame is sensed by thermocouple 26 which generates current to energize electromagnet 60. Armature 62, which was moved into electromagnet 60 by depression of reset button 56, is held in the withdrawn position by energization of the electromagnet, and reset button 56 may be released without closure of safety valve 33 due to the removal of the force from spring 64 by armature 62 being locked up and the force of the compression spring 58 biasing the valve 33 to the open position. The spring 75 will cause washer 74 to stop against shoulder 68, thus limiting its travel so that spring 75 will not close valve 33.

Selector dial 82 cannot be moved from the pilot position with reset button 56 depressed due to abutment with the peripheral edge of the reset button thereby preventing inadvertent opening of thermostatic valve 38 without the establishment of a flame at pilot burner 22. Furthermore, if reset button 56 is released prior to establishment of a flame at pilot burner 22, spring 64 will push armature 62 up to move valve stem 50 against the force from spring 58 and place valve member 48 in engagement with valve seat 32 to close safety valve 33 and prevent fuel from escaping unignited at pilot burner 22.

Once a flame has been established at the pilot burner, selector dial 82 is rotated to align "on" indicia thereon with the indexing mark on casing 11 to place stem 80 in the on position illustrated in FIGS. 5 and 6. With the control device in the on condition, safety valve 33 remains open due to the force from spring 58, and spring 58 is sufficiently strong to balance the fuel pressure on the underside of sealing diaphragm 54 to keep safety valve 33 open. Thermostatic valve 38 is permitted to operate with stem 80 in the on position due to the movement of protrusion 100 away from the cam follower end 126 of lever 123 thereby causing the lever to move clockwise with operating end 122 moving away from valve member 110. Thus, with control device 10 in the on condition, safety valve 33 and thermostatic valve 38 are permitted to operate under the control of electromagnet 60 and thermostat 104, respectively.

When thermostat 104 senses a demand for heat, clicker mechanism 108 will be operated by movement of rod 105 out of tube 106 to snap clicker disc 109 over-center, and the movement of clicker disc 109 engages member 118 to force valve member 110 away from valve seat 111 and permit fuel to flow to main burner 18 from inlet 12 through chamber 34, safety valve 33, chamber 36, thermostat valve 38, outlet 14 and conduit 20. Once the heat demand has been satisfied, rod 105 will move into tube 106 sufficiently to permit spring 120 to snap clicker disc 109 and place valve member 110 in engagement with valve seat 111 to close thermostatic valve 38 and prevent further fuel flow to main burner 18. If for any reason the flame at pilot burner 22 is extinguished, electromagnet 60 will be deenergized and armature 62 will be released and forced against valve stem 50 by spring 64 to move valve member 48 into engagement with valve seat 32 to close safety valve 33 by compressing spring 58 which acts to permit such override due to spring 64 being stronger than springs 58 and 75. Thus, it will be seen that in the on condition control device 10 permits thermostatic control of fuel with safety pilot monitoring.

In order to terminate operation, selector dial 82 is turned to the off position to return the control device to the off condition illustrated in FIGS. 1 and 2. Lever 70 is thus moved clockwise due to the riding of cam follower end 78 on lower arm 90 of control ridge 88 to compress springs 58 and 75 and close the safety valve regardless of whether or not electromagnet 60 is energized. Electromagnet 60 will remain energized after control device 10 is placed in the off condition due to the slow decay of thermocouple current; however, safety valve 33 will be closed by the cammed movement of lever 70 and additional sealing pressure for the safety valve will be provided by subsequent drop out of electromagnet 60. Thermostatic valve 38 is closed due to the caming of lever 123 against protrusion 100 as previously described in conjunction with FIGS. 1 and 2.

Cycling operation of thermostat 104 with control device 10 in the off or pilot conditions does not affect thermostatic valve 38 because override mechanism 114 accommodates snap movement of the clicker disc 109. That is, when thermostat 104 calls for heat clicker disc 109 is snapped over-center; however, member 118 is merely moved to compress spring 116 without moving valve member 110 away from valve seat 111.

From the above it can be seen that rotational movement of selector stem 80 provides permissive and dominating control of safety valve 33 and thermostatic valve 38. That is, when stem 80 is in the off position, the camming of levers 70 and 123 by control ridge 88 and control member 98 prevents operation of the safety and thermostatic valves. When stem 80 is in the pilot position, thermostatic valve 38 is still prevented from opening; however, safety valve 33 is permitted to be opened by reset button 56. When stem 80 is in the on position, thermostatic valve 38 is permitted to be opened by thermostat 104 and safety valve 33 is under the control of electromagnet 60.

Figure 7:
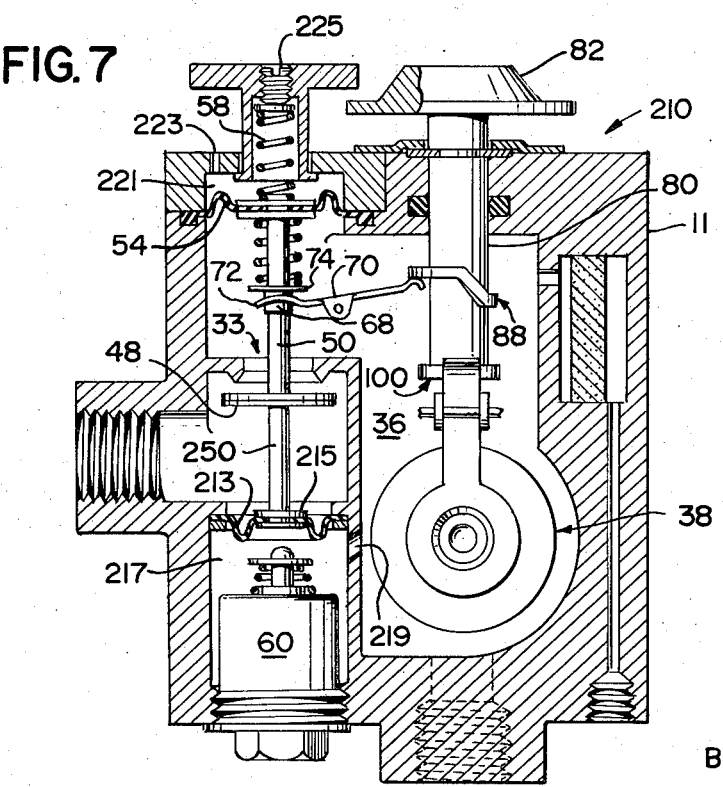
FIG. 7 is a front elevation, partially in section, of a modification of the flow control device of FIG. 1.

A modification of the control device of FIG. 1 is illustrated in FIG. 7 with the primary difference between the embodiments of FIGS. 1 and 7 being that the control device of FIG. 7 provides the additional function of pressure regulation. Parts of the embodiment of FIG. 7 which are identical to parts of the embodiment of FIG. 1 are given identical reference numbers and are not described again.

The control device, generally indicated at 210, has a balancing diaphragm 213 secured at its periphery in casing 11 at a position above electromagnet 60. Valve stem 250 is secured by means of a diaphragm pan 215 to balancing diaphragm 213 which defines a chamber 217 communicating with chamber 36 through a bleed passage 219 having a restricting orifice therein. Sealing diaphragm 54 defines a chamber 221 which communicates with the atmosphere through a vent 223, and an adjustment screw 225 threadedly engages reset button 56 and has an end upon which spring 58 is seated.

Operation of control device 210 in the off and pilot conditions is the same as that described with reference to FIGS. 1 through 4. However, in the on condition control device 210 serves to regulate gas pressure supplied to main burner 18 and pilot burner 22 as follows. Diaphragm 54 is subjected to the gas pressure in chamber 36 on one side and to the force from spring 58 as adjusted by screw 225 and atmospheric pressure on the other side. Diaphragm 54 operates in a conventional manner to impart a regulatory movement to valve stem 250 to maintain a constant outlet pressure. In addition, balancing diaphragm 213 is provided with a pressure balancing force of regulated fuel flow to secure a balance for the pressure differential effect on safety valve member 48. The balancing force is obtained by means of a bleed flow through passage 219 from chamber 36 to chamber 217. The restricting orifice in bleed passage 219 acts as a leak limiting device in case of rupture of balancing diaphragm 213. Bleed passage 219 communicates with chamber 36 upstream of thermostatic valve seat 111 so that the balancing feature is maintained for regulation of the pilot flow of fuel when the thermostatically operated valve 38 is closed.

Control devices 10 and 210 each have the advantage of obviating the need for a manual on-off valve while maintaining simultaneous control of the safety and thermostatic valves to provide complete on-off control.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A flow control device comprising
   a casing having inlet means adapted to receive fuel from a source, outlet means adapted to supply the fuel to a burner and flow passage means disposed between said inlet means and said outlet means;
   first valve means disposed in said flow passage means and operable to control fuel flow through said flow passage means;
   first operating means movable to provide permissive control of said first valve means;
   thermostat means controlling operation of said first valve means in response to temperature variations;
   second valve means disposed in said flow passage means and operable to control fuel flow through said flow passage means;
   second operating means movable to provide permissive control of said second valve means;
   safety means controlling operation of said second valve means in response to the existence of a flame at the burner; and
   selector means operative disposed in said casing and carrying control means engaging said first and second operating means to control the movement thereof whereby said first and second valve means are controlled simultaneously;
   said selector means including a stem, said control means including first and second cam surfaces carried on said stem, said first operating means including a first cam follower riding on said first cam surface and said second operating means including a second cam follower riding on said second cam surface.

2. The invention as recited in claim 1 wherein said first valve means includes a first valve member cooperating with a first valve seat to control flow therethrough, said second valve means includes a second valve member cooperating with a second valve seat to control flow therethrough, said first operating means includes a first lever pivotally mounted in said casing and having a first end forming said first cam follower and a second end controlling said first valve member, and said second operating means includes a second lever pivotally mounted in said casing and having a first end forming said second cam follower and a second end controlling said second valve member.

3. The invention as recited in claim 2 wherein said selector means includes a cylindrical stem, said first cam surface includes a protrusion extending from the bottom of said stem, and said second cam surface includes a ridge disposed around said stem and having an upper arm and a lower arm, said protrusion being aligned with said ridge such that said cam follower end of said first lever engages said protrusion when said selector means is rotated such that said lower arm engages said cam follower end of said second lever whereby said first and second valve means are closed.

4. A flow control device comprising
   a casing having inlet means adapted to receive fuel from a source, outlet means adapted to supply the fuel to a burner and flow passage means disposed between said inlet means and said outlet means;
   first valve means disposed in said flow passage means and operable to control fuel flow through said flow passage means;
   first operating means movable to provide permissive control of said first valve means;
   thermostat means controlling operation of said first valve means in response to temperature variations;
   second valve means operably disposed in said flow passage means to control fuel flow therethrough and including a valve seat and a valve stem carrying a valve member to cooperate with said valve seat;
   second operating means movable to provide permissive control of said second valve means;
   safety means controlling operation of said second valve means in response to the existence of a flame at the burner and including an electromagnet having an armature biased against said valve member to close said second valve means when the electromagnet is deenergized; and
   selector means operatively disposed in said casing and carrying control means engaging said first and second operating means to control the movement thereof whereby said first and second valve means are controlled simultaneously;
   said safety means including a reset button mounted on said casing in axial alignment with said valve stem and movable to displace said valve stem and said armature, said selector means having off and on positions preventing movement of said reset button and a pilot position permitting movement of said reset button.

5. The invention as recited in claim 4 wherein said valve stem has a first end adapted to be engaged by said armature and a second end secured to a regulating diaphragm disposed downstream of said valve seat to sense outlet pressure on one side thereof and bias means is disposed on the other side of said regulating diaphragm to apply a regulating force thereto.

6. The invention as recited in claim 5 wherein said first end of said valve stem is secured to a balancing diaphragm defining a balancing chamber, and said casing includes a bleed passage communicating with said balancing chamber and said flow passage means at a position upstream from said first valve means and downstream from said second valve means.

7. A flow control device comprising
a casing having inlet means adapted to receive fuel from a source, outlet means adapted to supply the fuel to a burner and flow passage means disposed between said inlet means and said outlet means;
first valve means disposed in said flow passage means and operable to control fuel flow through said flow passage means;
first operating means movable to provide permissive control of said first valve means;
thermostat means controlling operation of said first valve means in response to temperature variations;
second valve means disposed in said flow passage means and operable to control fuel flow through said flow passage means;
second operating means movable to provide permissive control of said second valve means;
safety means controlling operation of said second valve means in response to the existence of a flame at the burner; and
selector means operatively disposed in said casing and carrying control means engaging said first and second operating means to control the movement thereof whereby said first and second valve means are controlled simultaneously;
said first valve means including a valve member and an override mechanism engaging said valve member and said thermostat means, said override means including means responsive to movement of said thermostat means when said first operating means is moved to prevent operation of said first valve means to collapse and prevent said first valve means from opening.

8. The invention as recited in claim 7 wherein said valve member has a hollow portion and said collapsing means includes a coiled spring mounted in said hollow portion to be compressed by movement of said thermostat means.

9. In a thermally operated flow control device, the combination comprising
a casing having an inlet adapted to receive fuel from a source, a main outlet adapted to supply the fuel to a main burner, a pilot outlet adapted to supply the fuel to a pilot burner, a first chamber in communication with said inlet and a second chamber in communication with said main outlet and said pilot outlet;
safety valve means including a first valve seat disposed between said first and second chambers and a first valve member cooperating with said first valve seat to control flow between said first and second chambers;
electromagnetic safety means adapted to be energized when a flame is sensed at the pilot burner and including armature means biased toward said first valve member to close said safety valve means when said electromagnetic safety means is deenergized;
thermostatic valve means including a second valve seat disposed between said second chamber and said main outlet and a second valve member cooperating with said second valve seat to control flow between said second chamber and said main outlet;
thermostat means for controlling the operation of said second valve member in response to temperature variations;
selector means movably carried by said casing and including a stem carrying first and second cam means;
first lever means having a first cam follower end riding on said first cam means and a first operating end engaging said first valve member to provide dominating control of said safety valve means; and
second lever means having a second cam follower end riding on said second cam means and a second operating end engaging said second valve member to provide dominating control of said thermostatic valve means.

10. The invention as recited in claim 9 wherein said safety valve means includes a valve stem carrying said first valve member at a first end and having a second end upon which said first operating end of said first lever means operates.

11. The invention as recited in claim 10 wherein a first coiled spring is mounted in compression between said second end of said valve stem and said first operating end of said first lever means, a reset button is slidably mounted in said casing adjacent said second end of said valve stem and in axial alignment therewith, and a second coiled spring is mounted in compression between said second end of said valve stem and said reset button.

12. The invention as recited in claim 11 wherein said reset button has a first peripheral edge, and said selector means includes a dial secured to said stem having a second peripheral edge with a recess therein, said first peripheral edge overlapping said second peripheral edge such that said reset button is prevented from moving unless said dial is rotated to align said recess with said first peripheral edge.

13. The invention as recited in claim 12 wherein said selector means has an off position, a pilot position wherein said recess is aligned with said first peripheral edge of said reset button and an on position, said first cam means includes a control ridge disposed on said selector stem and having an upper arm with first and second portions and a lower arm, said second cam means includes a protrusion extending from said selector stem and aligned with said control ridge such that said first cam follower end of said first lever means engages said lower arm and said second follower end of said second lever means engages said protrusion to prevent operation of said safety and thermostatic valve means when said selector means is in said off position, said first cam follower end of said first lever means engages said first portion of said upper arm and said second cam follower end of said second lever means engages said protrusion to permit operation of said safety valve means by depression of said reset button and to prevent operation of said thermostatic valve when said selector means is in said pilot position, and said first cam follower end of said first lever means engages said second portion of said upper arm and said second cam follower end of said second lever means engages a reduced portion of said second cam means to permit operation of said safety valve means and said thermostatic valve means when said selector means is in said on position.

14. The invention as recited in claim 13 wherein said first end of said valve stem is secured to a balancing diaphragm having a periphery secured to said casing to define a balancing chamber, said second end of said valve stem is secured to a regulating diaphragm having a periphery secured to said casing in said second chamber to subject said regulating diaphragm to outlet pressure on one side and the force from said second spring on the other side, and said casing has a bleed passage therein providing communication between said second chamber and said balancing chamber.

15. The invention as recited in claim 14 wherein said thermostatic valve means includes an override mechanism engaging said second valve member and said thermostat means and operative to collapse when said thermostat means moves in a direction to open said thermostatic valve means and said selector means is in said off or pilot position whereby said second valve member is not moved away from said second valve seat.

16. The invention as recited in claim 9 wherein said safety valve means includes a valve stem having a first end and a second end, said first end of said valve stem being secured to a balancing diaphragm having a periphery secured to said casing to define a balancing chamber, said second end of said valve stem being secured to a regulating diaphragm having a periphery secured to said second chamber to subject said regulating diaphragm to outlet pressure on one side and the force from said second spring on the other side, and said casing having a bleed passage therein providing communication between said second chamber and said balancing chamber.

17. The invention as recited in claim 9 wherein said selector means has an off position, said second lever means prevents operation of said thermostatic valve when said selector means is in said off position, and said thermostatic valve means includes an override mechanism engaging said second valve member and said thermostat means and operative to collapse when said thermostat means moves in a direction to open said thermostatic valve means and said selector means is in said off position whereby said second valve member is not moved away from said second valve seat.

18. The invention as recited in claim 17 wherein a first coiled spring is mounted in compression between said second operating end of said second lever means and said valve member, said valve member has a hollow portion, and said override mechanism includes a second coiled spring mounted in compression in said hollow portion and being stronger than said first spring.

* * * * *